US008657665B1

(12) United States Patent
Ryan

(10) Patent No.: US 8,657,665 B1
(45) Date of Patent: Feb. 25, 2014

(54) ELECTRONIC GAMING DEVICE WITH SCRAPE AWAY FEATURE

(71) Applicant: Timothy Ryan, Duluth, GA (US)

(72) Inventor: Timothy Ryan, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 0 days.

(21) Appl. No.: 13/750,823

(22) Filed: Jan. 25, 2013

Related U.S. Application Data

(63) Continuation of application No. 13/570,457, filed on Aug. 9, 2012.

(51) Int. Cl.
*A63F 9/24* (2006.01)
*A63F 13/00* (2006.01)

(52) U.S. Cl.
USPC .................... 463/20; 463/21; 463/31; 463/36

(58) Field of Classification Search
USPC .......................................... 463/20, 11, 21, 31
See application file for complete search history.

(56) References Cited

U.S. PATENT DOCUMENTS

| | | | | |
|---|---|---|---|---|
| 5,855,514 | A * | 1/1999 | Kamille | 463/17 |
| 5,931,467 | A * | 8/1999 | Kamille | 273/139 |
| 6,089,976 | A * | 7/2000 | Schneider et al. | 463/16 |
| 6,102,798 | A * | 8/2000 | Bennett | 463/16 |
| 6,159,097 | A * | 12/2000 | Gura | 463/20 |
| 6,174,235 | B1 * | 1/2001 | Walker et al. | 463/25 |
| 6,254,481 | B1 * | 7/2001 | Jaffe | 463/20 |
| 6,261,177 | B1 * | 7/2001 | Bennett | 463/16 |
| 6,346,043 | B1 * | 2/2002 | Colin et al. | 463/17 |
| 6,347,996 | B1 * | 2/2002 | Gilmore et al. | 463/17 |
| 6,511,375 | B1 * | 1/2003 | Kaminkow | 463/20 |
| 6,514,144 | B2 * | 2/2003 | Riendeau et al. | 463/42 |
| 6,592,457 | B1 * | 7/2003 | Frohm et al. | 463/16 |
| 6,595,854 | B2 * | 7/2003 | Hughs-Baird et al. | 463/20 |
| 6,632,141 | B2 * | 10/2003 | Webb et al. | 463/25 |
| 6,672,960 | B1 * | 1/2004 | B-Jensen | 463/20 |
| 6,746,327 | B2 * | 6/2004 | Frohm et al. | 463/16 |
| 6,875,108 | B1 * | 4/2005 | Hughs-Baird | 463/26 |
| 6,964,416 | B2 * | 11/2005 | McClintic et al. | 273/273 |
| 6,997,806 | B2 * | 2/2006 | Falciglia, Sr. | 463/20 |
| 7,137,887 | B2 * | 11/2006 | Gomez et al. | 463/20 |
| 7,182,689 | B2 * | 2/2007 | Hughs-Baird et al. | 463/20 |
| 7,192,349 | B2 * | 3/2007 | Baerlocher et al. | 463/25 |
| 7,201,657 | B2 * | 4/2007 | Baerlocher et al. | 463/20 |
| 7,252,591 | B2 * | 8/2007 | Van Asdale | 463/22 |
| 7,273,415 | B2 * | 9/2007 | Cregan et al. | 463/25 |
| 7,297,058 | B2 * | 11/2007 | Gomez et al. | 463/16 |
| 7,314,409 | B2 * | 1/2008 | Maya et al. | 463/16 |
| 7,316,609 | B2 * | 1/2008 | Dunn et al. | 463/16 |
| 7,364,506 | B2 * | 4/2008 | Jaffe et al. | 463/20 |
| 7,390,260 | B2 * | 6/2008 | Englman | 463/20 |
| 7,455,585 | B2 * | 11/2008 | Englman | 463/16 |
| 7,470,186 | B2 * | 12/2008 | Cannon | 463/18 |
| 7,530,893 | B2 * | 5/2009 | Thomas | 463/20 |
| 7,690,981 | B2 * | 4/2010 | Ching et al. | 463/20 |
| 8,540,566 | B2 * | 9/2013 | Gregory-Brown et al. | 463/25 |
| 2003/0216167 | A1 * | 11/2003 | Gauselmann | 463/25 |
| 2004/0242300 | A1 * | 12/2004 | Nicely et al. | 463/16 |
| 2006/0178199 | A1 * | 8/2006 | Thomas | 463/20 |

* cited by examiner

*Primary Examiner* — Steven J Hylinski

(57) ABSTRACT

Examples disclosed herein relate to systems and methods, which may receive wagers. The systems and methods may include scrape away functionality.

20 Claims, 22 Drawing Sheets

FIG. 6B
FIG. 6C
FIG. 6D
602
608
YOU WIN PRIZE
PICK AGAIN!
604
608
YOU WIN PRIZE
PICK AGAIN!
606
610
GAME OVER

ELECTRONIC GAMING DEVICE WITH SCRAPE AWAY FEATURE

CROSS-REFERENCE TO RELATED PATENT APPLICATION

This application is a continuation of prior application Ser. No. 13/570,457 entitled "ELECTRONIC GAMING DEVICE WITH SCRAPE AWAY FEATURE", filed on Aug. 9, 2012, which is incorporated herein by reference in its entirety.

FIELD

The subject matter disclosed herein relates to an electronic gaming device. More specifically, the disclosure relates to an electronic gaming device, which provides gaming options relating to one or more scrape away features.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. The winning payout from a winning event may include one or more scrape away features as part of the base game and/or as a bonus game. A new way of delivering game play includes providing wagering gaming options, which may include scrape away options. In this disclosure, the gaming device and/or the gaming system may provide more excitement by allowing the player to initiate one or more scrape away features.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
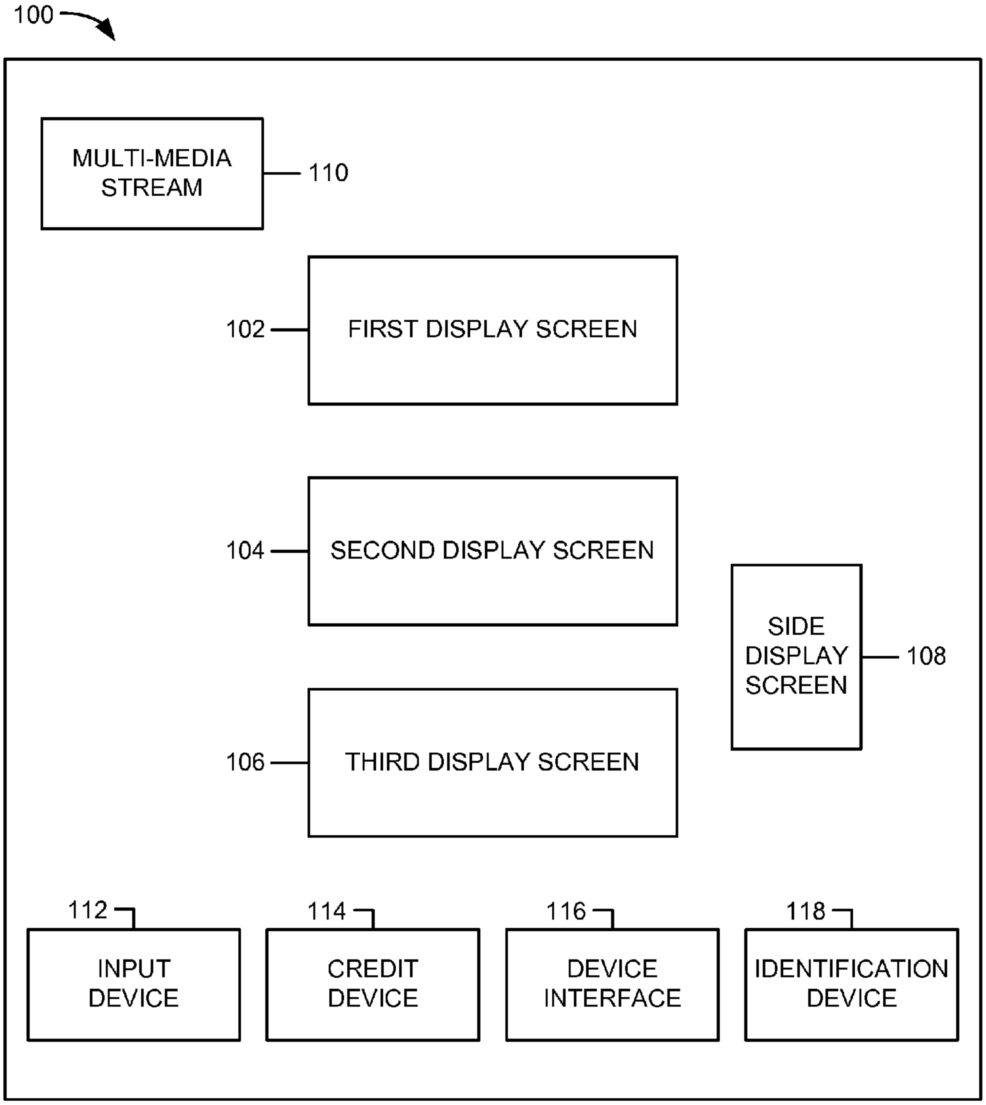
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to utilize one or more scrape away features, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), or any combination thereof. These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more scrape away options may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have scrape away gaming options only. Therefore, no non-scrape away gaming options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
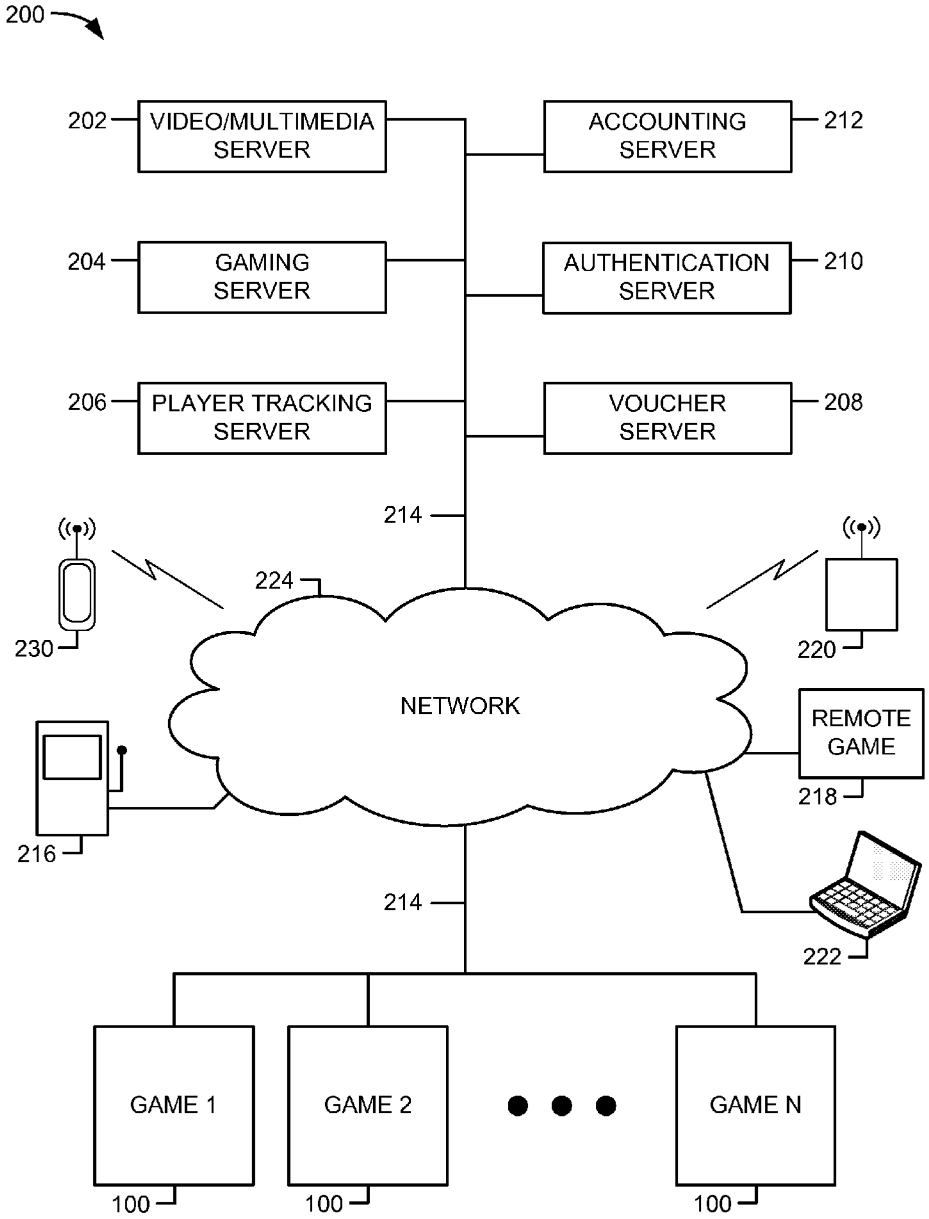
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include data from one or more scrape away features, multipliers, columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components such as, network interface cards, repeaters and hubs, bridges, switches, routers, firewalls, or any combination thereof may also be part of network 224.

Figure 3:
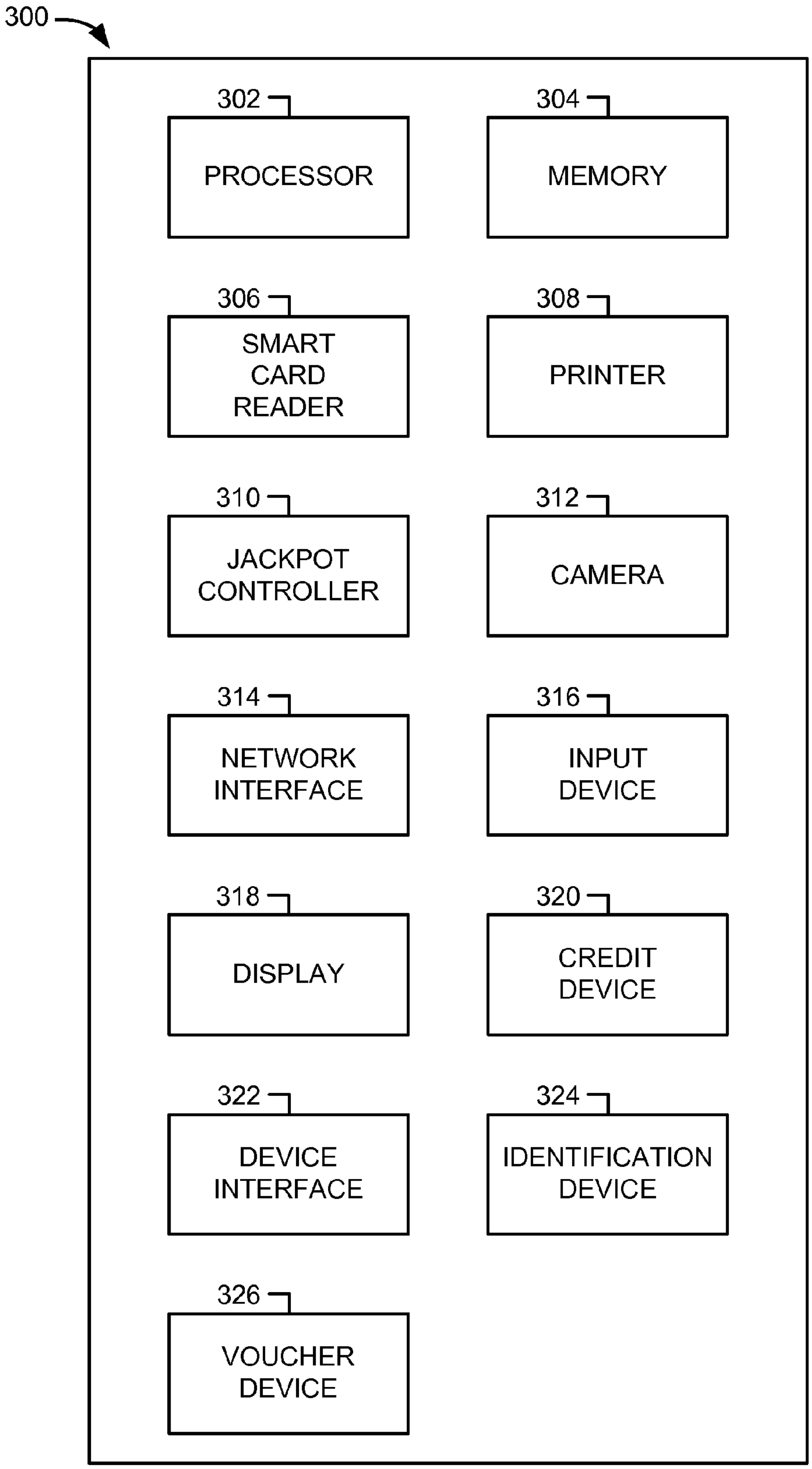
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
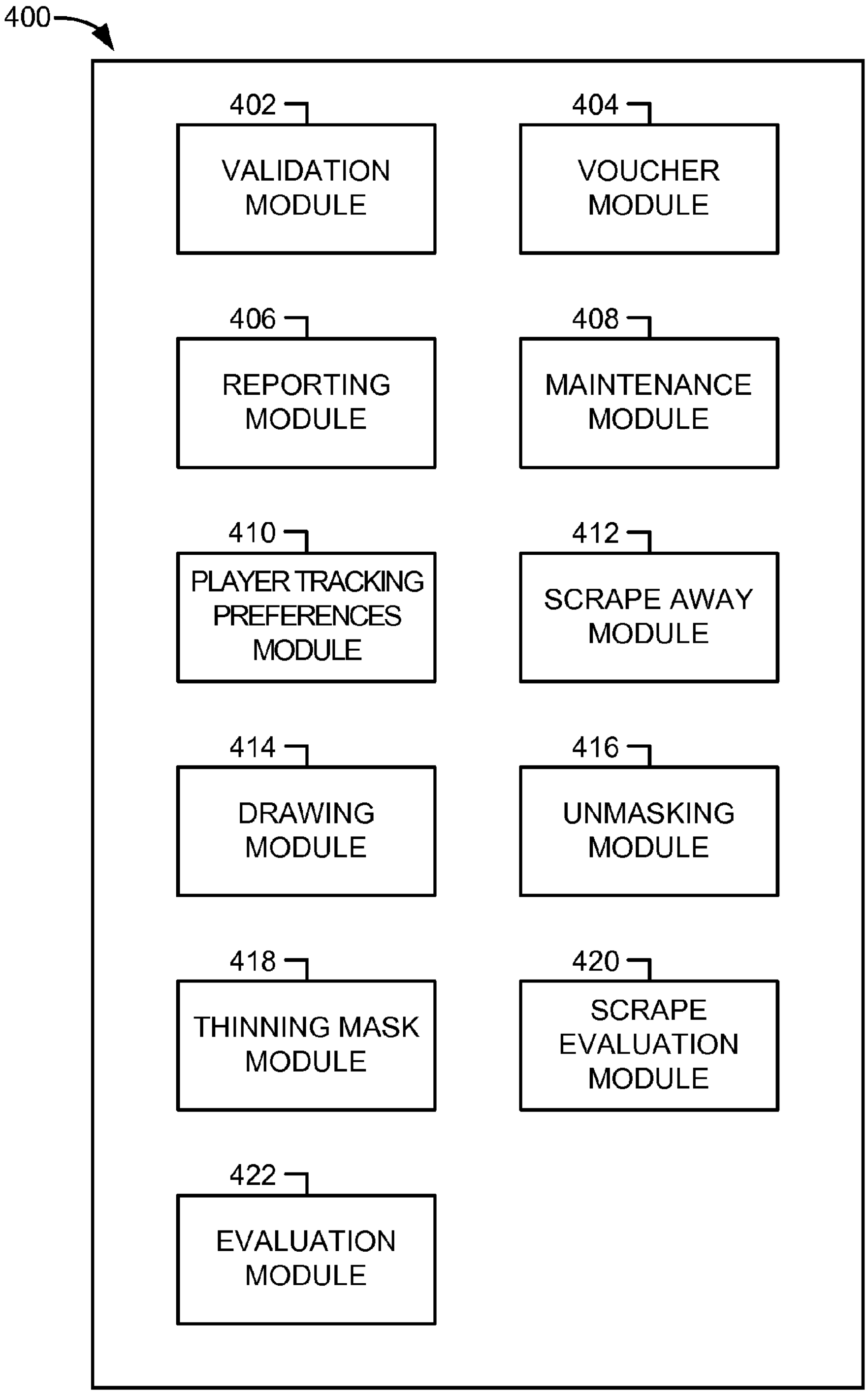
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a scrape away module 412, a drawing module 414, an unmasking module 416, a thinning mask module 418, a scrape evaluation module 420, and an evaluation module 422.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Scrape away module 412 may include one or more scrape away scenarios, structures, and/or architectures. For example, a first scrape away structure may be based on a leaf pattern. In this example, one or more leafs may be displayed on a screen and a player may remove one or more leafs to uncover one or more awards.

In another example, a second scrape away structure may be based on an acorn pattern. In this example, one or more acorns may be displayed on a screen and a player may remove one or more acorns to uncover one or more awards.

In another example, a third scrape away structure may be based on a building pattern. In this example, one or more building facilities may be displayed on a screen and a player may remove one or more portions (e.g., windows, doors, walls, etc.) of the one or more building facilities to uncover one or more awards.

In another example, a fourth scrape away structure may be based on a lottery ticket pattern. In this example, one or more lottery tickets may be displayed on a screen and a player may remove one or more portions of the lottery tickets to uncover one or more awards.

In another example, a fifth scrape away structure may be based on a dirt pattern. In this example, one or more dirt structures (e.g., mountains, hills, the ground, a field, etc.) may be displayed on a screen and a player may remove one or more portions of the dirt structures to uncover one or more awards.

The awards may be credits, free spins, multipliers, any other items of value, and/or any combination thereof.

Drawing module 414 may provide the functionality to generate one or more of the scrape away scenarios, structures, and/or architectures.

Unmasking module 416 may provide the functionality to generate the visual effects for uncovering the one or more awards and/or the removal of the one or more cover areas. For example, the one or more leafs may be visually removed utilizing one or more removal instruments (e.g., hand, rake, air blower, hoses, etc.). In another example, the one or more acorns may be visually removed utilizing one or more removal instruments (e.g., hand, rake, air blower, hoses, squirrel, etc.). The acorns may be replaced by any other item (e.g., animal, apples, berries, people, specific people (e.g., actors), etc.). In another example, the one or more portions of the one or more building patterns may be visually removed utilizing one or more removal instruments (e.g., hand, gun, tank, airplane, wrecking ball, etc.). In another example, the one or more lottery ticket may be visually removed utilizing one or more removal instruments (e.g., hand, coin, etc.). In another example, the one or more portions of the one or more dirt structures may be visually removed utilizing one or more removal instruments (e.g., hand, pick, spade, shovel, etc.).

Thinning mask module 418 may provide the functionality to generate the visual effects of thinning out the one or more cover areas during the removal process. For example, the one or more leafs may be visually removed utilizing one or more removal instruments (e.g., hand, rake, air blower, hoses, etc.) by passing the removal instrument over the covered area more than one time. In this example, the air blower may be utilized to pass a first air blast over the leafs, which partially uncovers the award and a second air blast over the leafs, which totally uncovers the award. It should be noted that any amount (e.g., 2 to N) of air blasts may be required to uncover the award.

In another example, the one or more portions of the one or more building patterns may be visually removed utilizing one or more removal instruments (e.g., hand, gun, tank, airplane, wrecking ball, etc.) by passing the removal instrument over the covered area more than one time. In this example, a first missile may be utilized to partially uncover an award. A second missile may uncover more of the award but does not allow the player to win the award. A third missile may totally uncover the award which may then be paid out to the player.

In another example, the one or more lottery ticket may be visually removed utilizing one or more removal instruments (e.g., hand, coin, etc.) by passing the removal instrument over the covered area more than one time. In this example, the player may scratch a coin over the lottery ticket in a first area which reveals a portion of the prize. The player may then scratch a coin over the lottery ticket in a second area which reveals the prize.

In another example, the one or more portions of the one or more dirt structures may be visually removed utilizing one or more removal instruments (e.g., hand, pick, spade, shovel, etc.) by passing the removal instrument over the covered area more than one time. In this example, the player may utilize the shovel to remove dirt (and/or a stone) to partial display an award. The player may then utilize the pick to break up a rock and remove the rock. The player may then utilize the spade to remove a fragile item (e.g., a diamond, etc.) and/or work around a threat item (e.g., a land mine, etc.) to obtain the award.

Scrape evaluation module 420 may determine payouts related to game results when a scrape away gaming functionality is utilized.

Evaluation module 414 may determine payouts related to game results when there are no scrape away gaming functionality utilized.

It should be noted that scrape evaluation module 420 and evaluation module 414 may be combined into one module. Further, there may be one evaluation module where the determined payout does not depend on whether there were any wild symbols, scatter symbols, and/or any other specific symbols. Further, any module, device, and/or logic function in electronic gamine device 100 may be present in electronic gaming system 200. In addition, any module, device, and/or logic function in electronic gaming system 200 may be present in electronic gaming device 100.

Figure 5A:
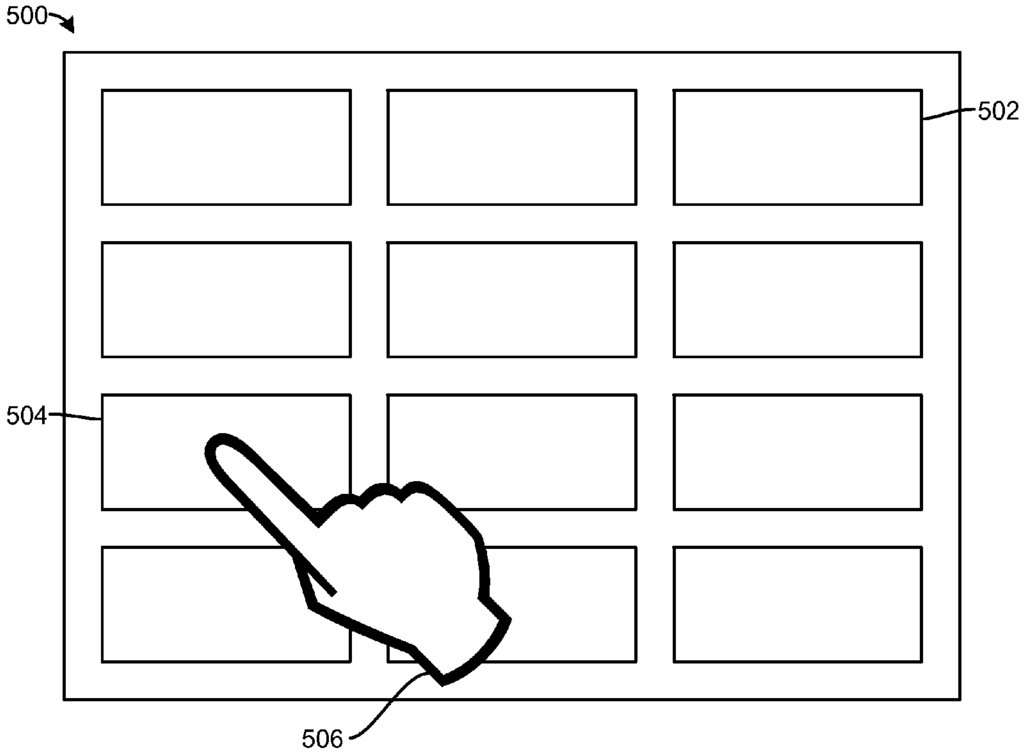
FIG. 5A is an illustration of utilizing a scrape away option on an electronic gaming device, according to one embodiment.

FIG. 5A is an illustration of utilizing a scrape away option on electronic gaming device 100, according to one embodiment. A gaming image 500 may include one or more selection areas 502, a selected area 504, and a selector 506.

Figure 5B:
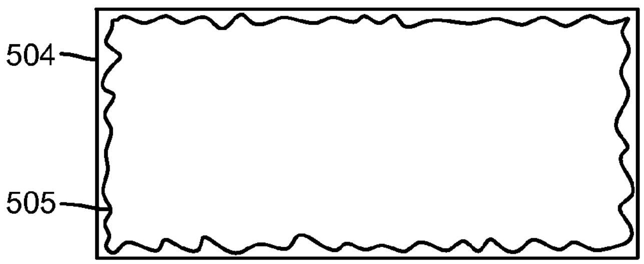
FIG. 5B is another illustration of utilizing a scrape away option on an electronic gaming device, according to one embodiment.

In FIG. 5B, another illustration of utilizing a scrape away option on electronic gaming device 100 is shown, according to one embodiment. In this example, selected area 504 may include a covered area 505. Covered area 505 may be removed utilizing a removal tool to reveal an award.

Figure 5C:
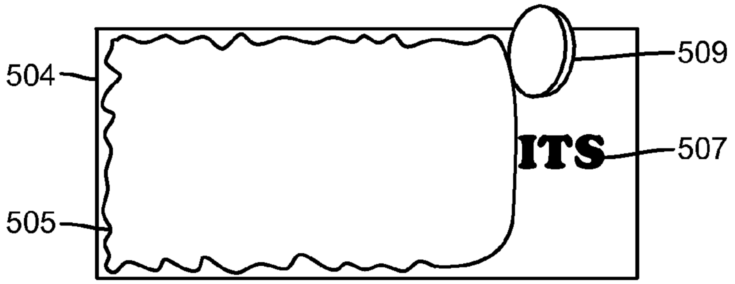
FIG. 5C is another illustration of utilizing a scrape away option on an electronic gaming device, according to one embodiment.

FIG. 5C is an illustration of utilizing a scrape away option on electronic gaming device 100, according to one embodiment. In this example, covered area 505 may be partially (or fully) removed by passing a coin image 509 (e.g., removal tool) over covered area 505 to reveal a portion of an award 507.

Figure 5D:
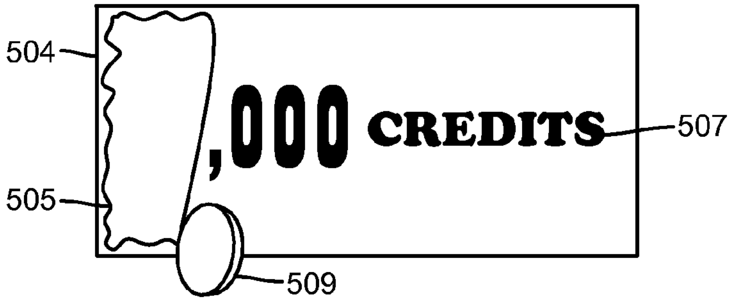
FIG. 5D is another illustration of utilizing a scrape away option on an electronic gaming device, according to one embodiment.

In FIG. 5D, another illustration of utilizing a scrape away option on electronic gaming device 100 is shown, according to one embodiment. In this example, the area removed on covered area 505 may be increased by additional passes of coin image 509 over covered area 505 to reveal more of award 507.

Figure 5E:
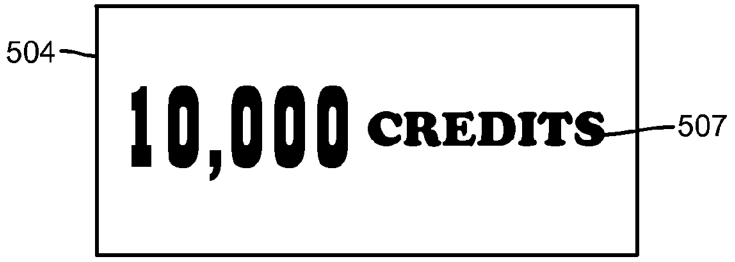
FIG. 5E is another illustration of utilizing a scrape away option on an electronic gaming device, according to one embodiment.

In FIG. 5E, another illustration of utilizing a scrape away option on electronic gaming device 100 is shown, according to one embodiment. In this example, the area removed on covered area 505 may be increased by additional passes of coin image 509 over covered area 505 to reveal all of award 507, which may then be paid out.

In another example, covered area 505 may be totally removed by one pass, two passes, three passes, or any number of passes of removal tool over covered area 505. Further, covered area 505 may be removed by any input from the player, electronic gaming device 100, and/or electronic gaming system 200.

Figure 6A:
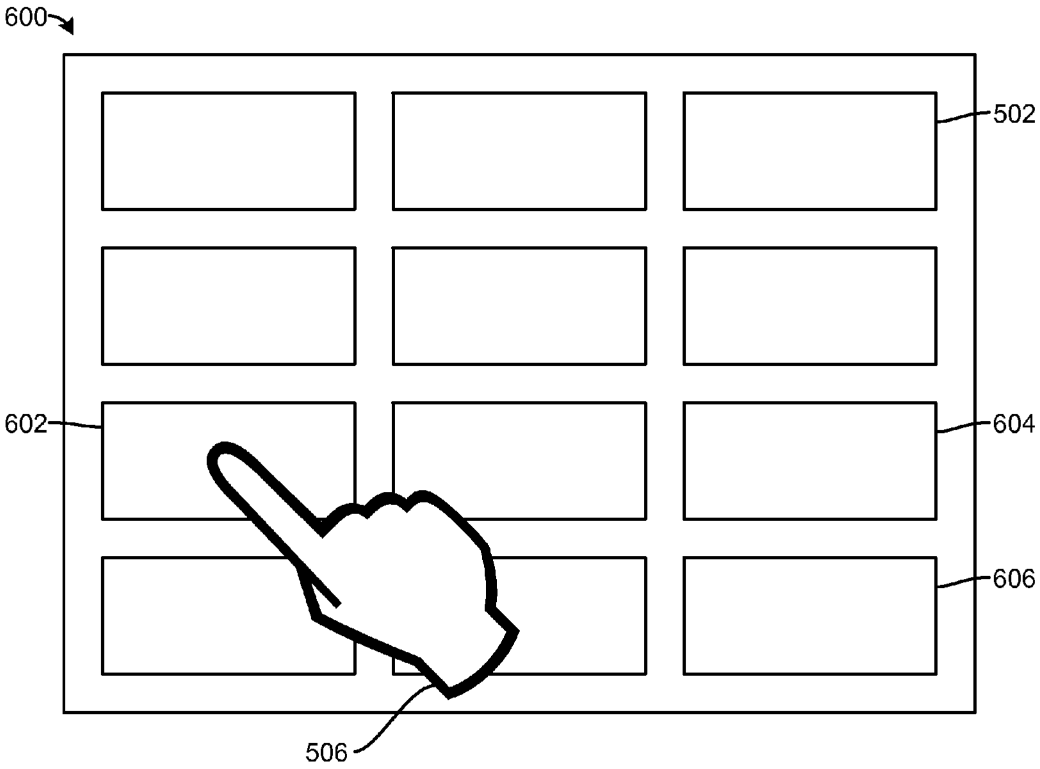
FIG. 6A is an illustration of utilizing a scrape away option on an electronic gaming device, according to one embodiment.

In FIG. 6A, an illustration of utilizing a scrape away option on electronic gaming device 100, according to one embodiment. A gaming image 600 may include one or more selection areas 502, a first selected area 602, a second selected area 604, a third selected area 606, and selector 506. In this example, the player via selector 506 has chosen first selected area 602 (see FIG. 6B), which revealed an award.

Figure 6B:
FIG. 6B is another illustration of utilizing a scrape away option on an electronic gaming device, according to one embodiment.

In FIG. 6B, another illustration of utilizing a scrape away option on electronic gaming device 100, according to one embodiment. In this example, first selected area 602 may include a status bar 608. Status bar 608 may indicate any status relating to any gaming option. For example, status bar 608 indicates that more selections may be made from one or more selection areas 502 because there is no X present in status bar 608. First selected area 602 may include a message indicating the award amount and/or the ability to continue selecting areas from one or more selection areas 502. The award amount may be credits, free spins, multipliers, any item of value, and/or any combination thereof. In this example, the message states "YOU WIN PRIZE PICK AGAIN!." Any data may be utilized to generate the message. For example, you have thirty seconds left to make your final two selections.

Figure 6C:
FIG. 6C is another illustration of utilizing a scrape away option on an electronic gaming device, according to one embodiment.

In FIG. 6C, another illustration of utilizing a scrape away option on electronic gaming device 100, according to one embodiment. In this example, second selected area 604 may include status bar 608. Status bar 608 may indicate that more selections may be made from one or more selection areas 502 because there is no X present in status bar 608. Second selected area 604 may include a message indicating the award amount and/or the ability to continue selecting areas from one or more selection areas 502. The award amount may be credits, free spins, multipliers, any item of value, and/or any combination thereof. In this example, the message states "YOU WIN PRIZE PICK AGAIN!."

Figure 6D:
FIG. 6D is another illustration of utilizing a scrape away option on an electronic gaming device, according to one embodiment.

In FIG. 6D, another illustration of utilizing a scrape away option on electronic gaming device 100, according to one embodiment. In this example, third selected area 606 may include status bar with a game over indication 610. Status bar may indicate that no more selections may be made from one or more selection areas 502 because there is an X present in status bar. Third selected area 606 may include a message indicating the award amount and/or the ability to continue selecting areas from one or more selection areas 502. The award amount may be credits, free spins, multipliers, any item of value, and/or any combination thereof. In this example, the message states "GAME OVER".

Figure 7A:
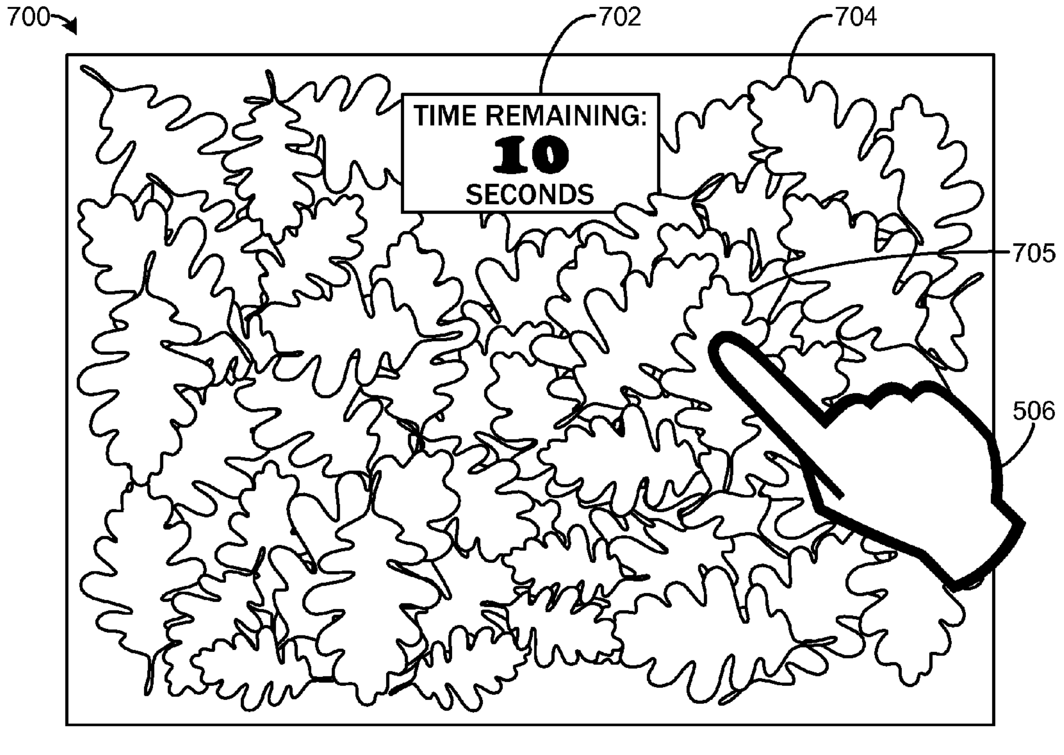
FIG. 7A is an illustration of utilizing a scrape away option on an electronic gaming device, according to one embodiment.

In FIG. 7A, an illustration of utilizing a scrape away option on an electronic gaming device is shown, according to one embodiment. A first scrape away gaming image 700 may include a timer 702, one or more removable objects 704, and selector 506. The player may utilize selector 506 to select a first selected object 705. First selected object 705 may be removed from first scrape away gaming image 700 (see FIG. 7B). In this example, the scrape away game has a timing element present. Timer 702 shows that the time remaining is 10 seconds. In another embodiment, there may be no timing element. In another embodiment, there be a predetermined number of picks that may occur. In another embodiment, the prize may be additional picks and/or additional time. For example, a prize may be revealed which increases timer 702 by a predetermined and/or randomly determined amount of time (e.g., 5 seconds, 10 seconds, 30 seconds, 2 minutes, etc.) In another example, a prize may be revealed which increases the amount of picks (e.g., 1 additional pick, 2 additional picks, etc.). The prize may combine the increase in time, picks, credits, free spins, multipliers, and/or any item of value.

Figure 7B:
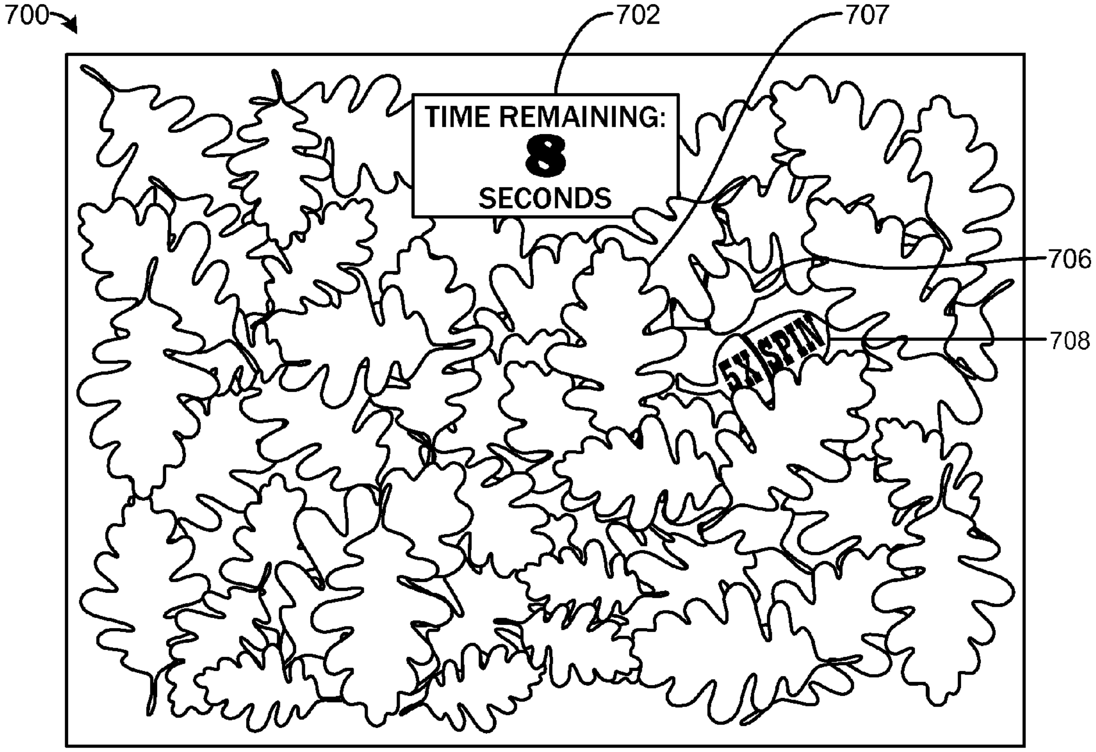
FIG. 7B is another illustration of utilizing a scrape away option on an electronic gaming device, according to one embodiment.

In FIG. 7B, another illustration of utilizing a scrape away option on an electronic gaming device is shown, according to one embodiment. After first selected object 705 has been removed, first scrape away gaming image 700 may include a first revealed prize 708 and a first partially revealed prize 706. First revealed prize 708 may be a prize that is won without any further removal of one or more removable objects 704. Whereas, first partially revealed prize 706 may be a prize that is not won until further removable objects 704 are removed. The prize associated with first revealed prize 708 may be credits, free spins, multipliers, any item of value, or any combination thereof. In this example, the prize was free spins. First partially revealed prize 706 may be completely revealed (e.g., unlocked) if the player selects a second selected object 707 (see FIG. 7C). The player may select another removable object 704 because timer 702 shows that the time remaining is 8 seconds.

Figure 7C:
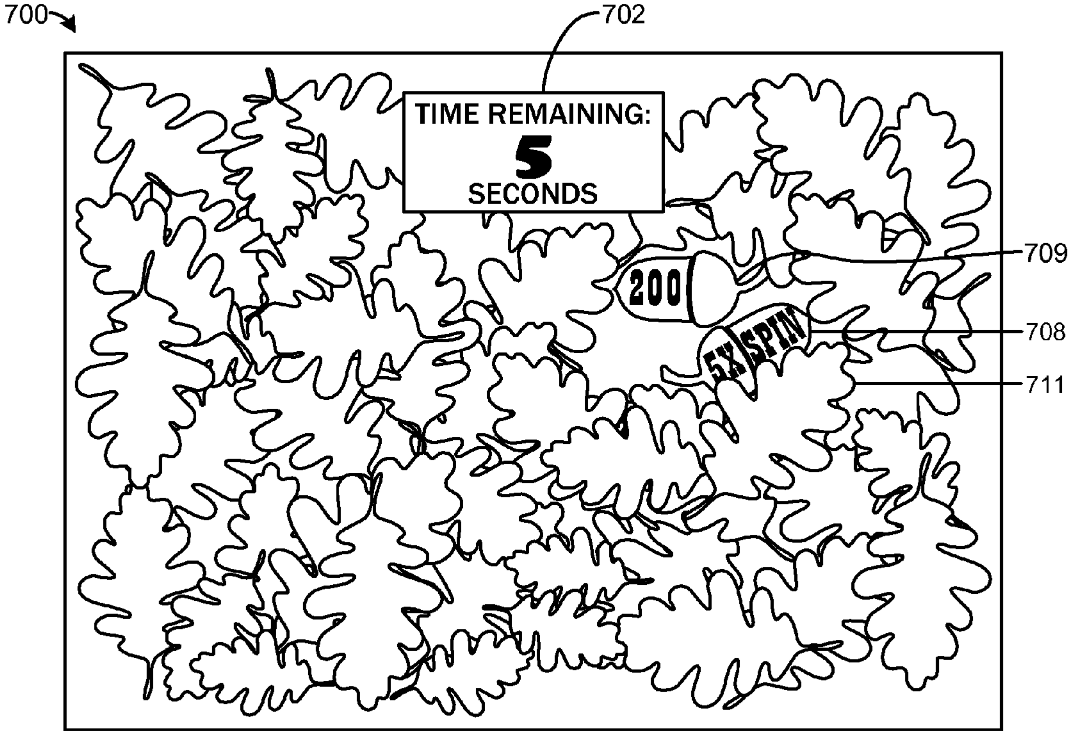
FIG. 7C is another illustration of utilizing a scrape away option on an electronic gaming device, according to one embodiment.

In FIG. 7C, another illustration of utilizing a scrape away option on an electronic gaming device is shown, according to one embodiment. After second selected object 707 has been removed, first scrape away gaming image 700 may include first revealed prize 708, a second revealed prize 709, and no partially revealed prizes. First revealed prize 708 and second revealed prize 709 may be prizes that are won without any further removal of one or more removable objects 704. The player may select another removable object 704 because timer 702 shows that the time remaining is 5 seconds. The player may select via selector 506 a third selected object 711.

Figure 7D:
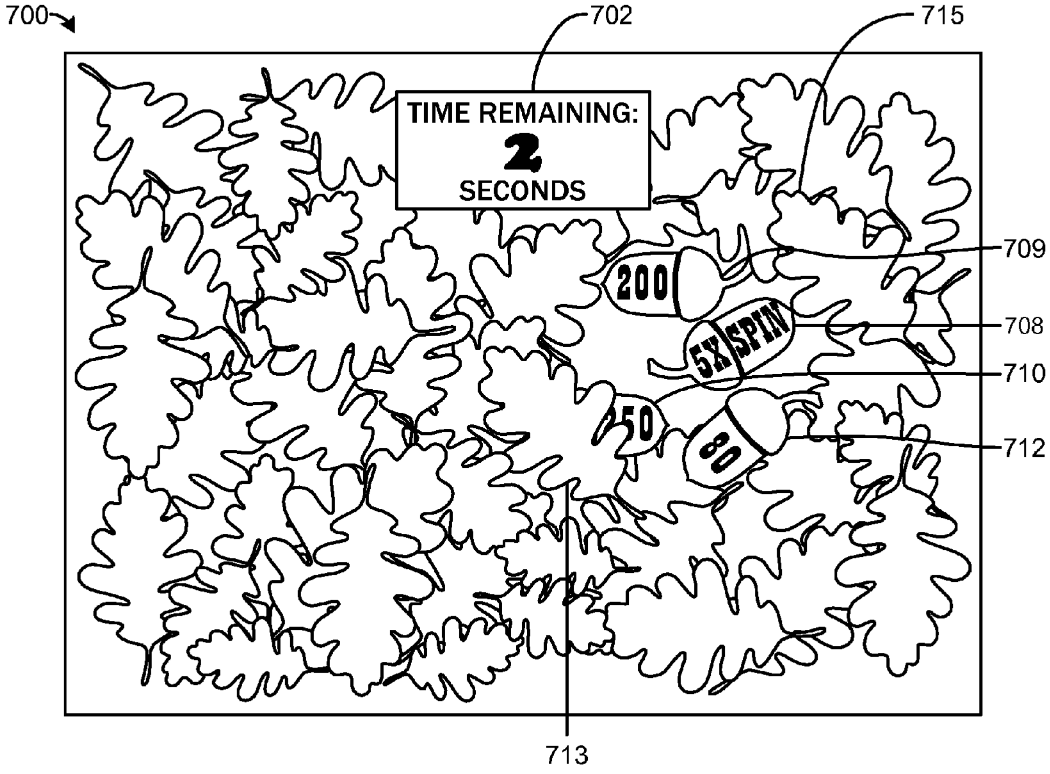
FIG. 7D is another illustration of utilizing a scrape away option on an electronic gaming device, according to one embodiment.

In FIG. 7D, another illustration of utilizing a scrape away option on an electronic gaming device is shown, according to one embodiment. After third selected object 711 has been removed, first scrape away gaming image 700 may include first revealed prize 708, second revealed prize 706, a third revealed prize 712, and a second partially revealed prize 710. First revealed prize 708, second revealed prize 706, and third revealed prize 712 may be prizes that are won without any further removal of one or more removable objects 704. Whereas, second partially revealed prize 710 may be a prize that is not won until further removable objects 704 are removed. Second partially revealed prize 710 may be completely revealed (e.g., unlocked) if the player selects a fourth selected object 713 (see FIG. 7E). The player may select another removable object 704 because timer 702 shows that the time remaining is 2 seconds. In this example, the player may be allowed to select more than one removable object. This may be based on the timer running out (e.g., the game is almost over), randomly determined, predetermined time periods, and/or any other game criteria. In this case, the player has selected both fourth selected object 713 and a fifth selected object 715 (see FIG. 7E).

Figure 7E:
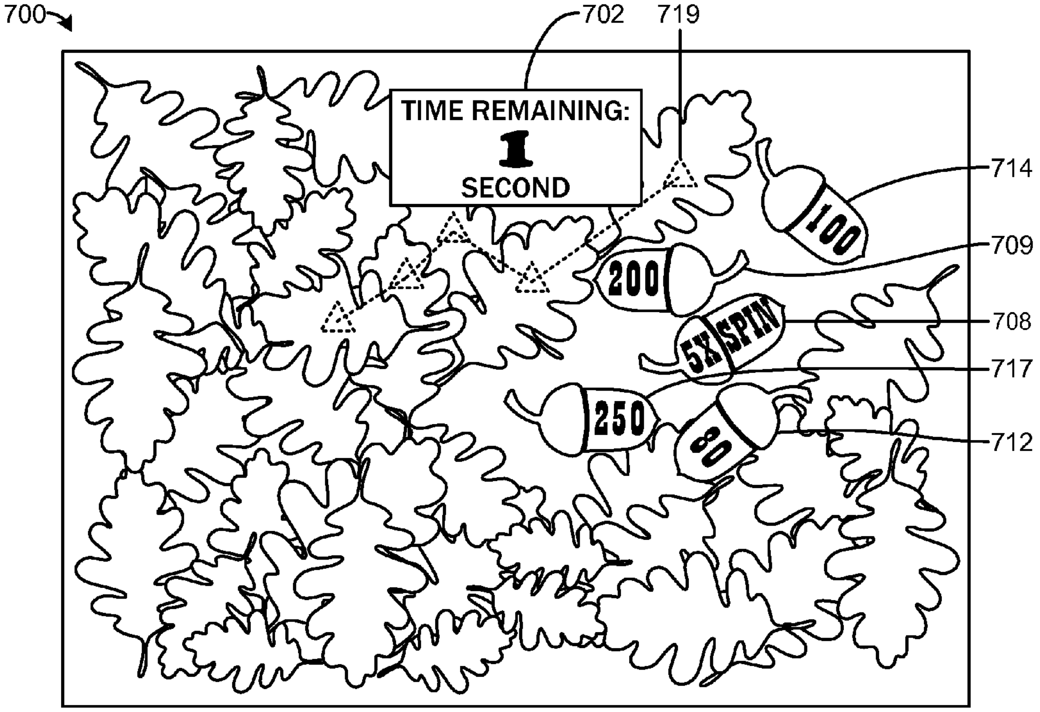
FIG. 7E is another illustration of utilizing a scrape away option on an electronic gaming device, according to one embodiment.

In FIG. 7E, another illustration of utilizing a scrape away option on an electronic gaming device is shown, according to one embodiment. After fourth selected object 713 and fifth selected object 715 have been removed, first scrape away gaming image 700 may include first revealed prize 708, second revealed prize 706, third revealed prize 712, a fourth revealed prize 714, and a fifth revealed prize 717, and no partially revealed prize. First revealed prize 708, second revealed prize 706, third revealed prize 712, fourth revealed prize 714, and fifth revealed prize 717 may be prizes that are won without any further removal of one or more removable objects 704. The player may select another removable object 704 because timer 702 shows that the time remaining is 1 second. In this example, the selectable areas may have increased in size based on the timer running out (e.g., the game is almost over), randomly determined, predetermined time periods, and/or any other game criteria. In this case, the player has selected a sixth selected object 719 (see FIG. 7F).

Figure 7F:
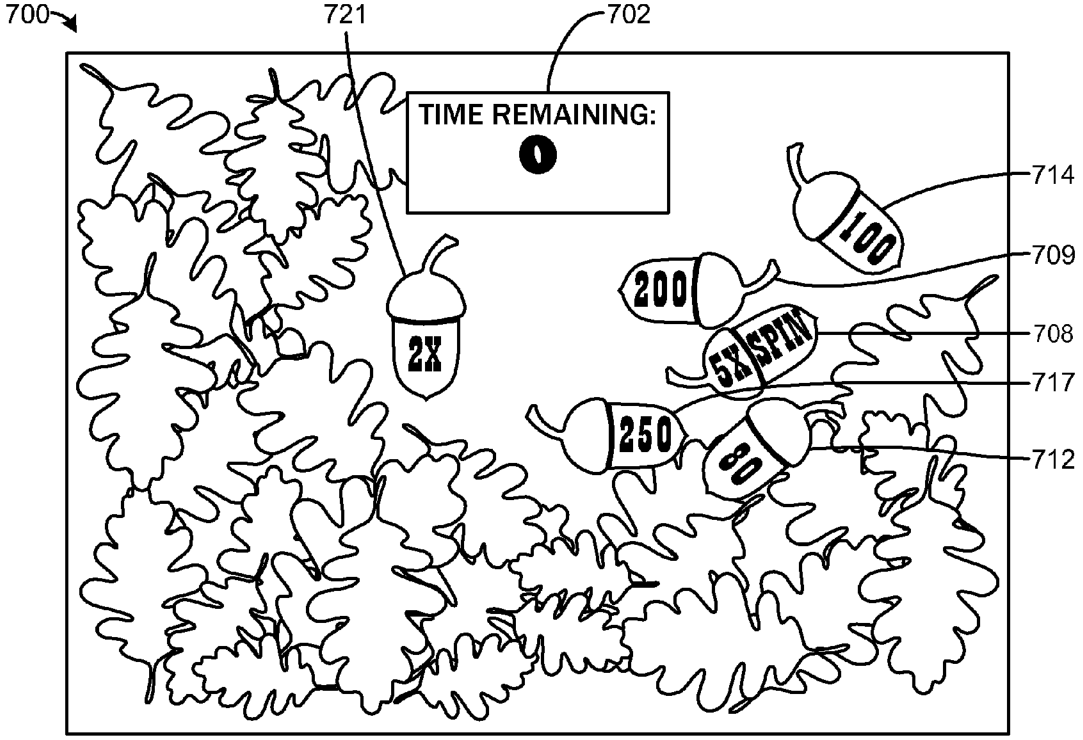
FIG. 7F is another illustration of utilizing a scrape away option on an electronic gaming device, according to one embodiment.

In FIG. 7F, another illustration of utilizing a scrape away option on an electronic gaming device is shown, according to one embodiment. After sixth selected object 719 has been removed, first scrape away gaming image 700 may include first revealed prize 708, second revealed prize 706, third revealed prize 712, fourth revealed prize 714, fifth revealed prize 717, and a sixth revealed prize 721, and no partially revealed prize. First revealed prize 708, second revealed prize 706, third revealed prize 712, fourth revealed prize 714, fifth revealed prize 717, and sixth revealed prize 721 may be prizes that are won without any further removal of one or more removable objects 704. In this example, sixth revealed prize 721 is a multiplier of 2×. This multiplier may increase all of the previous credits won, may increase all past and future credits won, may increase the amount of free spins won in the past and/or the future, may increase another multiplier to generate a super multiplier (e.g., a previously won 3× multiplier may be increased to 5× (e.g., 3× plus 2×) or the previously won 3× multiplier may be increased to 6× (e.g., 3× times 2×)). The player may not select another removable object 704 because timer 702 shows that the time remaining is 0 second.

Figure 7G:
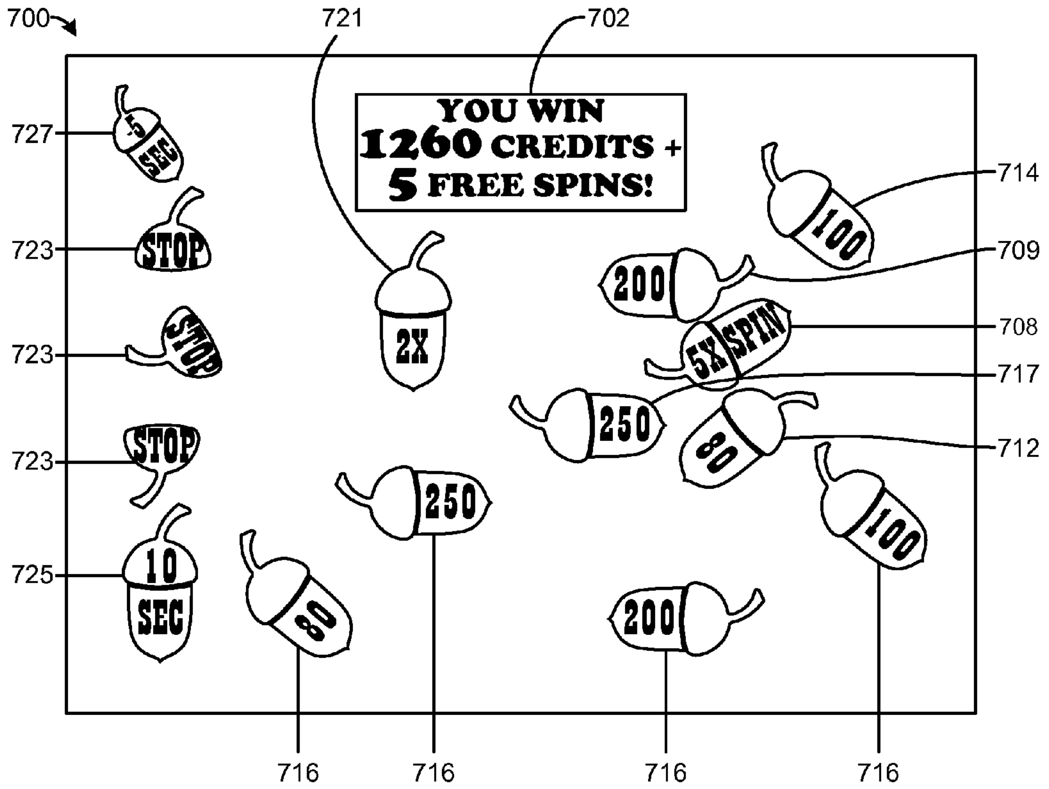
FIG. 7G is another illustration of utilizing a scrape away option on an electronic gaming device, according to one embodiment.

In FIG. 7G, another illustration of utilizing a scrape away option on an electronic gaming device is shown, according to one embodiment. First scrape away gaming image 700 may reveal all of potential prizes, game extenders, game limiters, and stoppers. In this example, first scrape away gaming image 700 shows the prizes that were won from first revealed prize 708, second revealed prize 706, third revealed prize 712, fourth revealed prize 714, fifth revealed prize 717, and sixth revealed prize 721. Further, first scrape away gaming image 700 may show prizes that were not won, such as one or more non-won prizes 716. In addition, first scrape away gaming image 700 may show a first game extender 725 which would have added 10 seconds to timer 702. First scrape away gaming image 700 may show a first game limiter 727 which would have decrease timer 702 by 5 seconds. In other embodiments, the time increases/decrease may be replaced with pick increases/decreases. First scrape away gaming image 700 may show one or more game stoppers 723, which would have ended game play. In this example, timer 702 may now display the outcome of game play, which was that the player won 1260 credits (e.g., 630 times the 2× multiplier) and 5 free spins.

Figure 8:
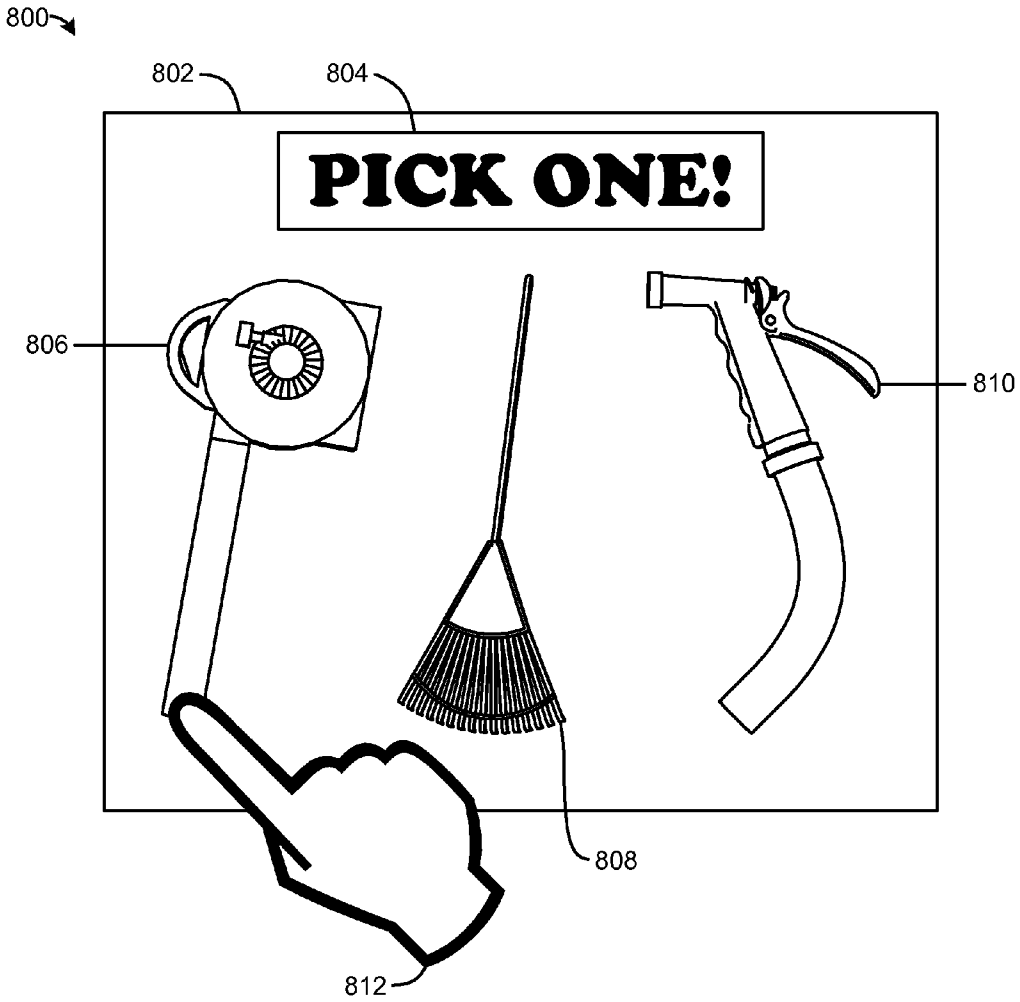
FIG. 8 is a tool selection illustration, according to one embodiment.

In FIG. 8, a tool selection illustration 800 is shown, according to one embodiment. A tool selection image 802 may include a message 804, a first tool 806, a second tool 808, a third tool 810, and a tool selection input device 812. In this example, message 804 may request that the player select one of the tools to be utilized in a selection/removal process to interact with one or more removable objects 704. In this example, first tool 806 may be displayed as a blower, second tool 808 may be displayed as a rake, and third tool 810 may be displayed as a hose. Each tool may have a different reach (e.g., effective removal area). For example, first tool 806 may have a first reach (e.g., 1 unit), second tool 808 may have a second reach (e.g., 2 units), and third tool 810 may have a third reach (e.g., 3 units). In addition, each tool may have any reach in any direction. Further, one or more tools may have the same reach characteristics.

Each tool may be utilized a different number of times. For example, first tool 806 may be utilized a first number of times (e.g., 5 times), second tool 808 may be utilized a second number of times (e.g., 3 times), and third tool 810 may be utilized a third number of times (e.g., 2 times). In addition, each tool may be utilized any number of times. Further, one or more tools may have the same utilization characteristics (e.g., number of times utilized).

Figure 9A:
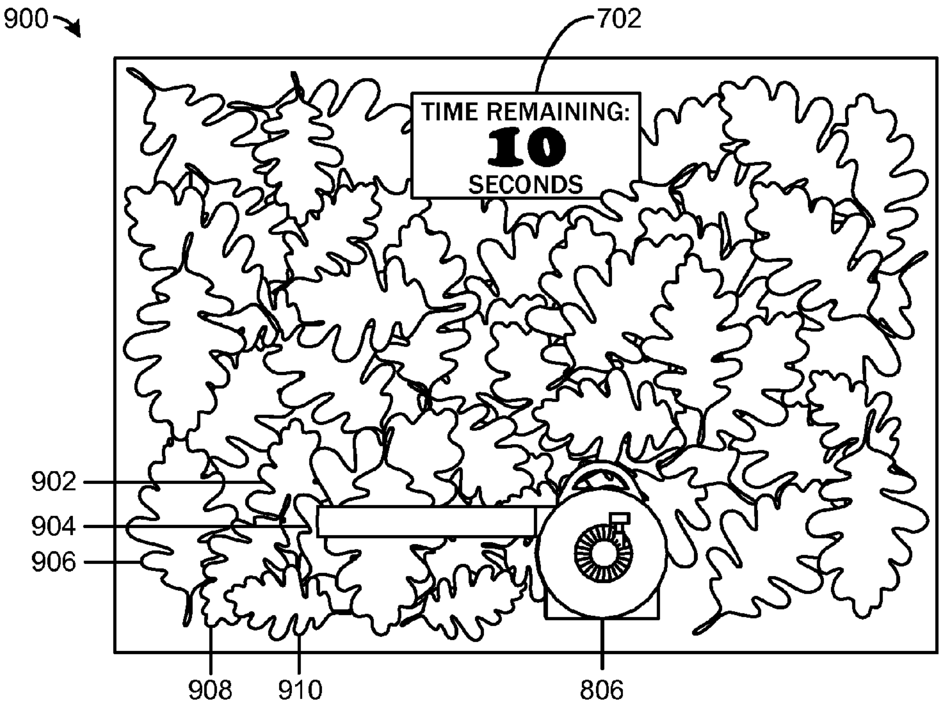
FIG. 9A is an illustration of utilizing a scrape away option on an electronic gaming device, according to one embodiment.

In FIG. 9A, an illustration of utilizing a scrape away option on an electronic gaming device is shown, according to one embodiment. A first gaming image 900 may include timer 702 and first tool 806. In this example, the player has selected first tool 806 to remove one or more removable objects 704.

Figure 9B:
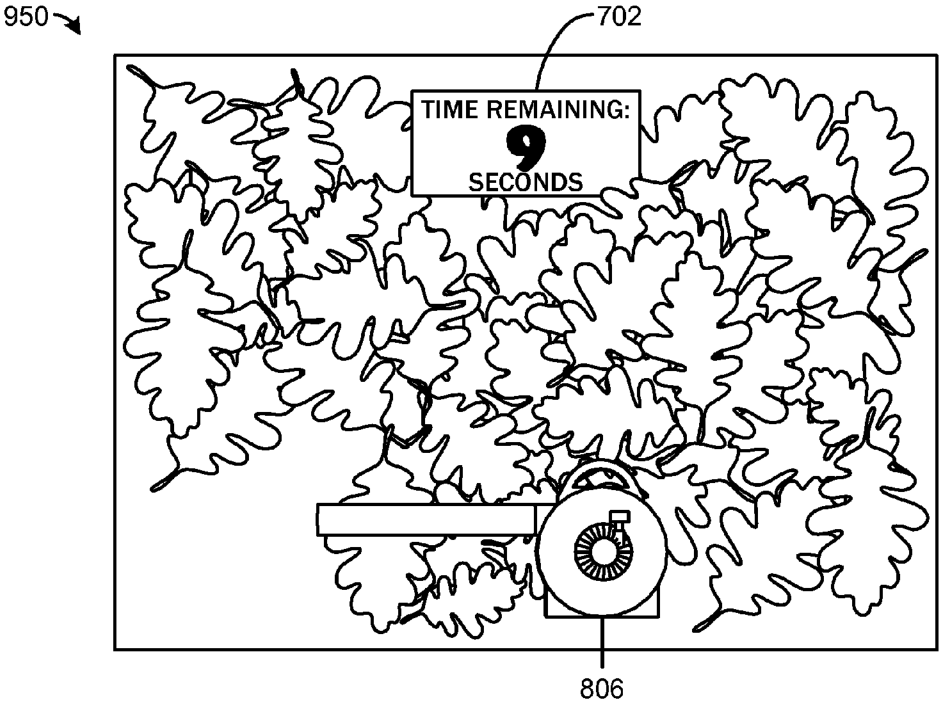
FIG. 9B is another illustration of utilizing a scrape away option on an electronic gaming device, according to one embodiment.

In FIG. 9B, another illustration of utilizing a scrape away option on an electronic gaming device is shown, according to one embodiment. A second gaming image 950 shows that a first removable object 902, a second removable object 904, a third removable object 906, a fourth removable object 908, and a fifth removable object 910 were removed by utilizing first tool 806. In this example, first tool 806 had a reach of 5.

Figure 10A:
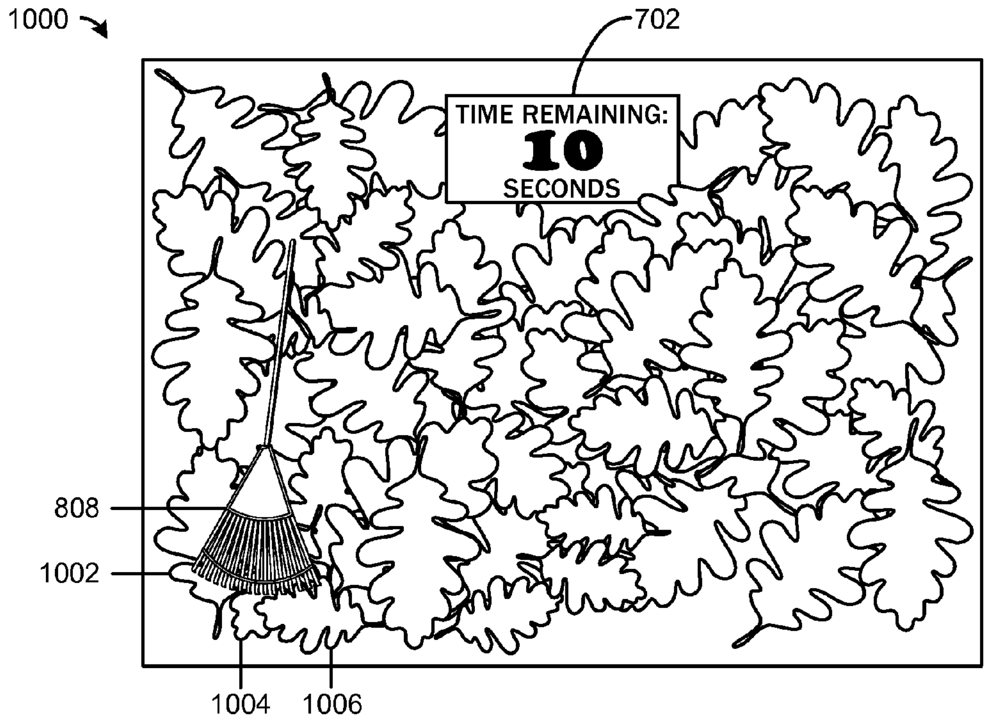
FIG. 10A is another illustration of utilizing a scrape away option on an electronic gaming device, according to one embodiment.

In FIG. 10A, an illustration of utilizing a scrape away option on an electronic gaming device is shown, according to one embodiment. A third gaming image 1000 may include timer 702 and second tool 808. In this example, the player has selected second tool 808 to remove one or more removable objects 704.

Figure 10B:
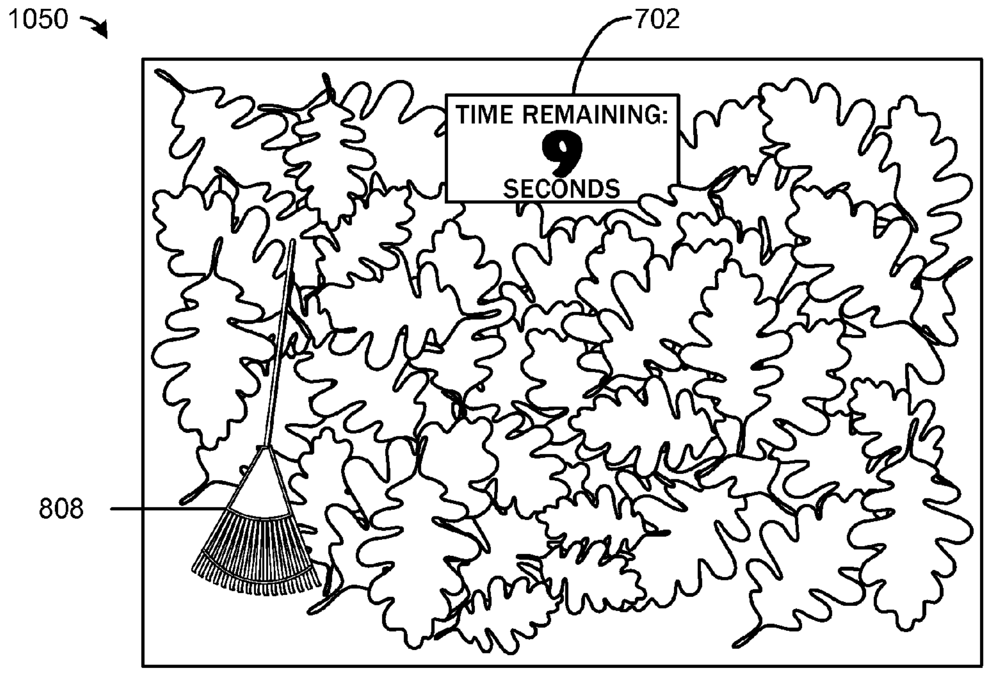
FIG. 10B is another illustration of utilizing a scrape away option on an electronic gaming device, according to one embodiment.

In FIG. 10B, another illustration of utilizing a scrape away option on an electronic gaming device is shown, according to one embodiment. A fourth gaming image 1050 shows that a sixth removable object 1002, a seventh removable object 1004, and an eighth removable object 1006 were removed by utilizing second tool 808. In this example, second tool 808 had a reach of 3.

Figure 11A:
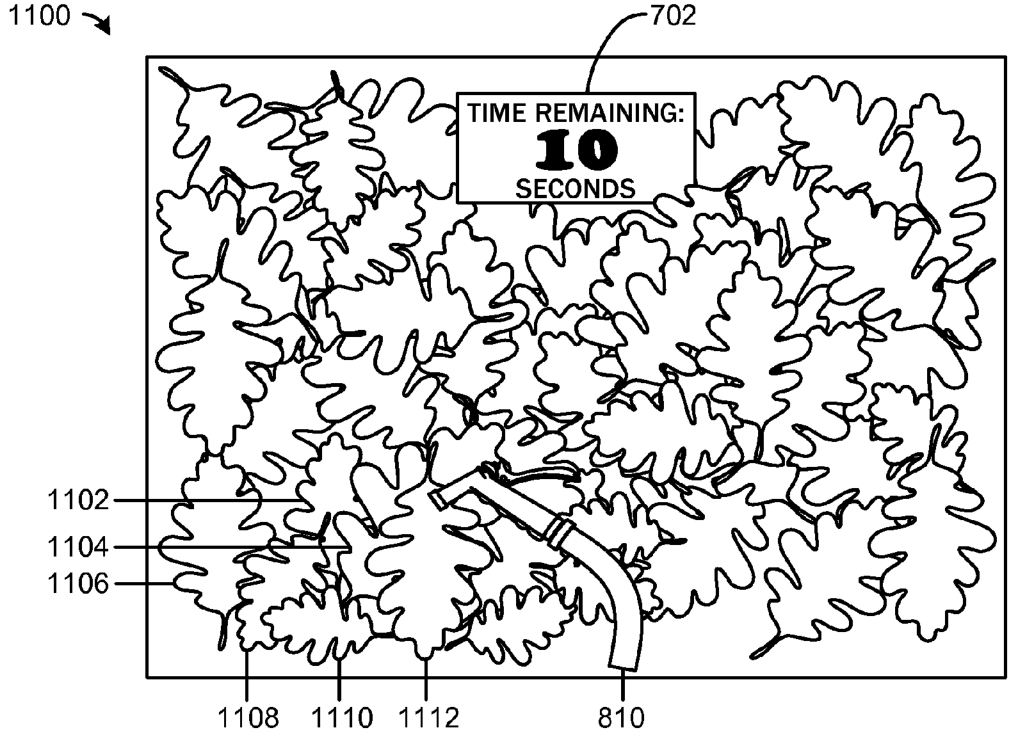
FIG. 11A is another illustration of utilizing a scrape away option on an electronic gaming device, according to one embodiment.

In FIG. 11A, an illustration of utilizing a scrape away option on an electronic gaming device is shown, according to one embodiment. A fifth gaming image 1100 may include timer 702 and third tool 810. In this example, the player has selected third tool 810 to remove one or more removable objects 704.

Figure 11B:
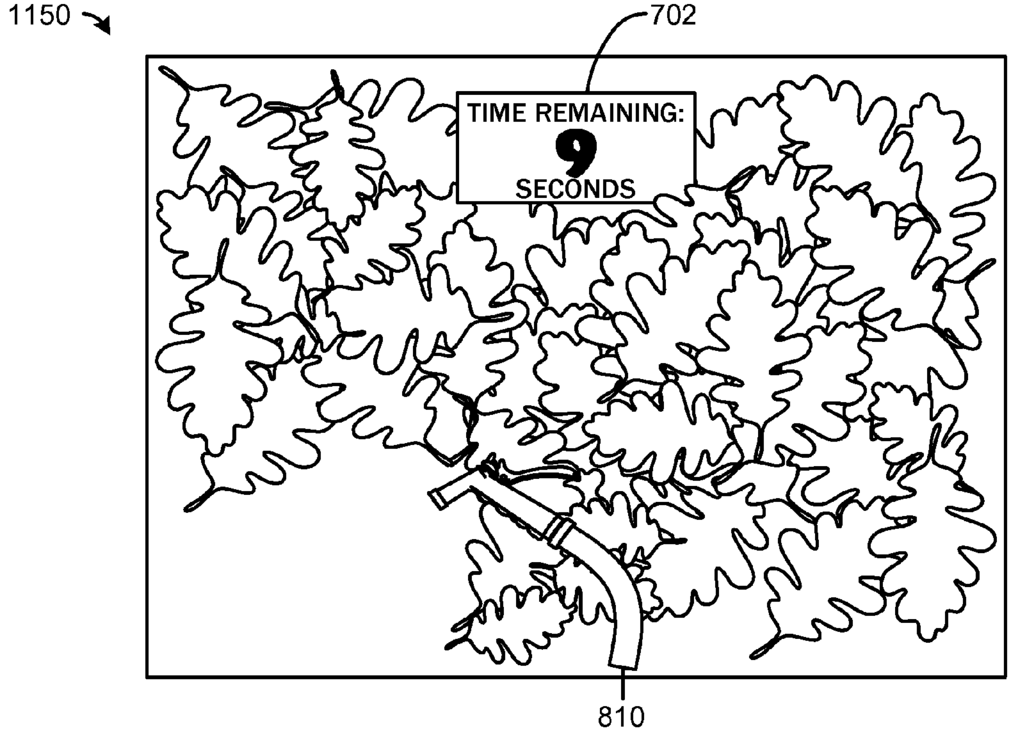
FIG. 11B is another illustration of utilizing a scrape away option on an electronic gaming device, according to one embodiment.

In FIG. 11B, another illustration of utilizing a scrape away option on an electronic gaming device is shown, according to one embodiment. A sixth gaming image 1150 shows that a ninth removable object 1102, a tenth removable object 1104, an eleventh removable object 1106, a twelfth removable object 1108, a thirteenth removable object 1110, and a fourteenth removable object 1112 were removed by utilizing third tool 810. In this example, third tool 810 had a reach of 6.

In these examples, the reach may be in any direction and the tools may be utilized any number of times.

Figure 12:
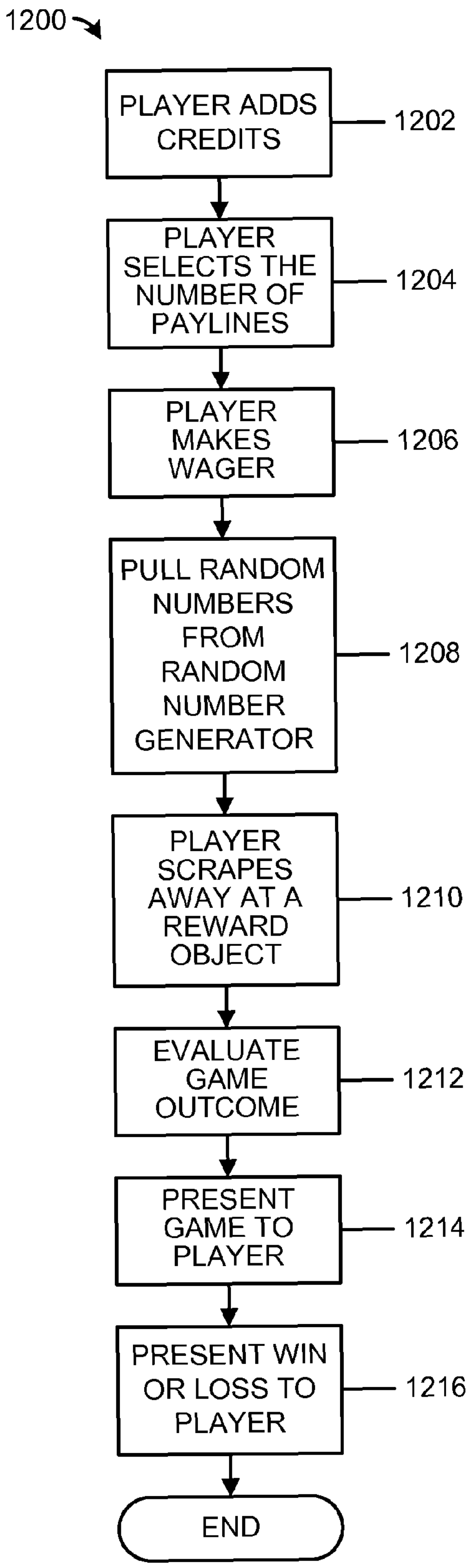
FIG. 12 is a flow diagram for utilizing one or more scrape away options, according to one embodiment.

In FIG. 12, a flow diagram for scrape away gaming 1200 is shown. The method may include the starting of the game. The method may include the player adding credits to electronic gaming device 100 and/or electronic gaming system 200 (step 1202). The method may include the selection of the number of paylines (step 1204). The method may include the placing of a wager (step 1206). The method may include electronic gaming device 100 and/or electronic gaming system 200 pulling random numbers from a random number generator (step 1208). The method may include the scraping away of a cover area over a reward object (step 1210). The method may include the evaluation of the game outcome (step 1212). This evaluation may include the evaluation of the primary game and/or an evaluation of the reward object. The method may include displaying the game presentation (step 1214). The method may include presenting a winning or losing outcome to the player (step 1216). The method may end.

The method may include the starting of the game. The method may include the player adding credits to electronic gaming device 100. The method may include the player selecting the number of paylines to utilize. The method may include the player making a primary wager on one or more paylines. The method may further include the player making a secondary wager to enable a scrape away option. The method may include receiving input relating to utilizing a scrape away option. The method may include electronic gaming device 100 pulling random numbers from the random number generator. The method may include the evaluation of the game outcome for the primary wager. The method may further include the evaluation of the game outcome for the secondary wager. The method may include presenting the game play to the player. The method may include presenting the game outcome (win or loss) to the player. The method may then end.

Figure 13:
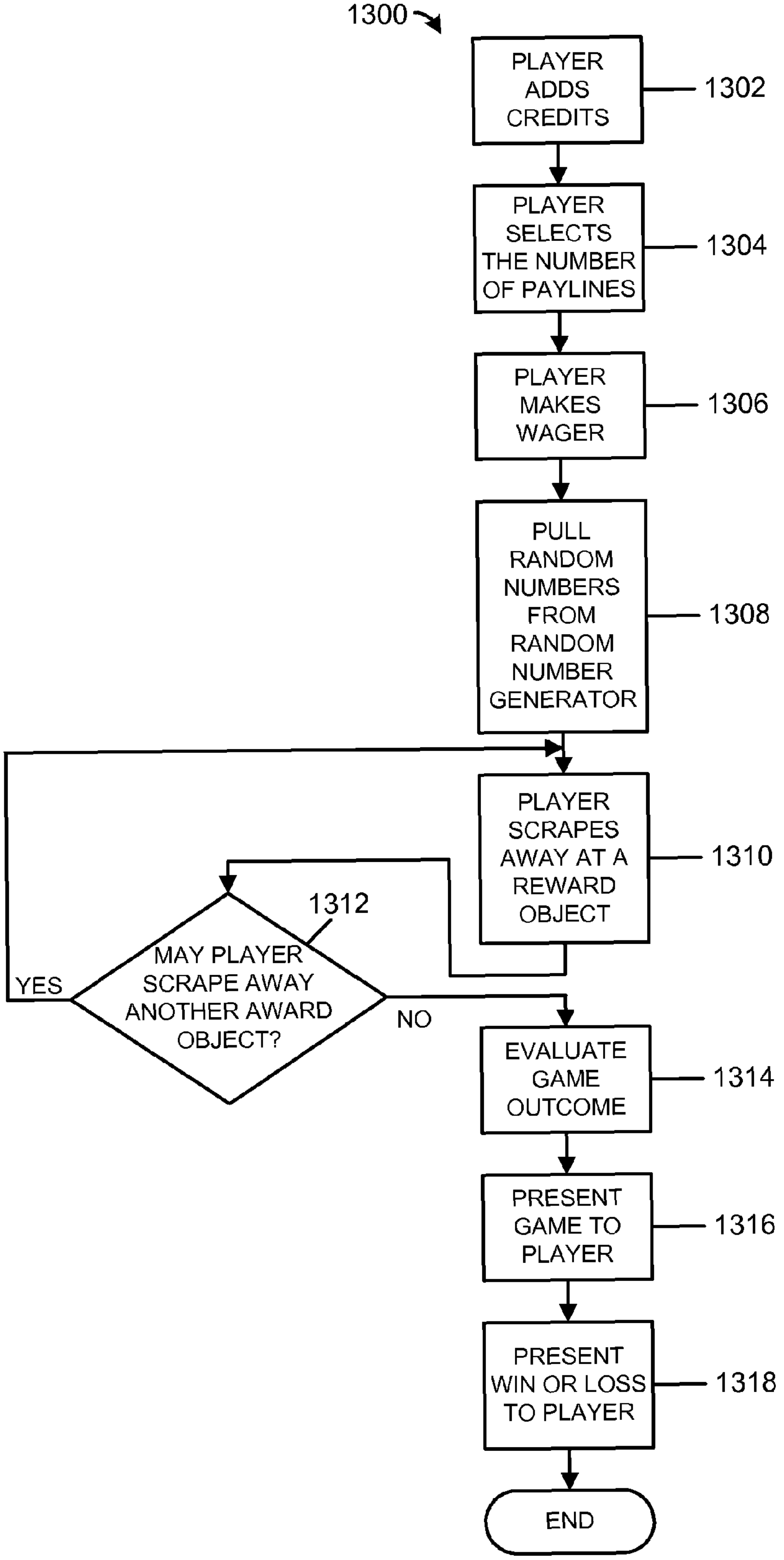
FIG. 13 is another flow diagram for utilizing one or more scrape away options, according to one embodiment.

In FIG. 13, a flow diagram for utilizing a scraping away functionality 1300 is shown, according to one embodiment. The method may include the player adding credits to electronic gaming device 100 and/or electronic gaming system 200 (step 1302). The method may include the selection of the number of paylines (step 1304). The method may include the placing of a wager (step 1306). The method may include electronic gaming device 100 and/or electronic gaming system 200 pulling random numbers from a random number generator (step 1308). The method may include the scraping away of a cover area over a reward object (step 1310). The method may include electronic gaming device 100 and/or electronic gaming system 200 determining whether another award object may be selected via the scrape away functionality (step 1312). If another award object may be selected via the scrape away functionality, then the method moves to step 1310. If another award object may not be selected via the scrape away functionality, then the method may include the evaluation of the game outcome (step 1314). This evaluation may include the evaluation of the primary game and/or an evaluation of the reward object. The method may include displaying the game presentation (step 1316). The method may include presenting a winning or losing outcome to the player (step 1318). The method may end.

Figure 14:
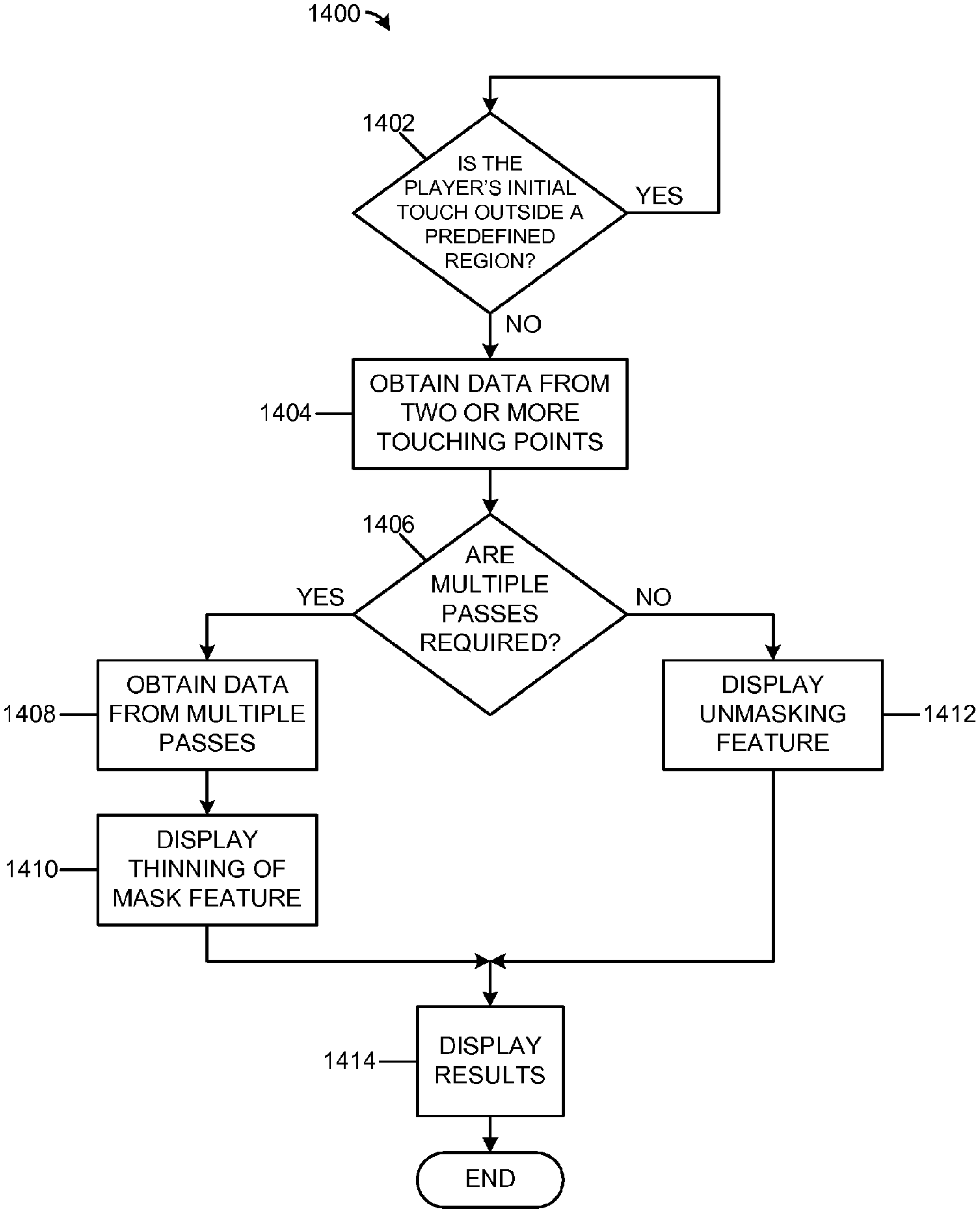
FIG. 14 is another flow diagram for utilizing one or more scrape away options, according to one embodiment.

In FIG. 14, a flow diagram for utilizing one or more scrape away options 1400 is shown, according to one embodiment. The method may include electronic gaming device 100 and/or electronic gaming system 200 determining whether the player's initial touch was outside a predefined region (step 1402). If the player's touch was outside a predefined region, the method moves back to step 1402. If the player's touch was within the predefined region, the method may obtain data from two or more touching points (step 1404). The method may include electronic gaming device 100 and/or electronic gaming system 200 determining whether there are multiple passes required (step 1406). If there is no requirement for multiple passes, the method may display an unmasking feature (step 1402), display the results (step 1414), and end. If multiple passes are required, the method may obtain data from multiple passes (step 1408). The method may also include displaying thinning of the mask feature (step 1410). The method may display the results (step 1414) and the method may end.

For example, if a player touches an area outside of a predefined region, the system and/or method may wait until the player touches a predefined region and/or transmit a message to the player requesting the player to touch a predefined region and/or communicating that the area the player is touching is not an appropriate area. In another example, the player may not be required to pass over the predefined region more than once so that the prize is revealed once the player has touched a specific area. In another example, the player may be required to make more than one pass over the predefined region more than once so that the prize is revealed. In this example, the covered area may partially disappear after each passes (e.g., thinning effect, scratching effect, etc.).

In an exemplary embodiment, the electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more scrape away gaming options.

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on one or more multiplier banking options.

The plurality of reels may form a 5-by-5 matrix, a 3-by-5 matrix, a 4-by-5 matrix, a 4-by-3 matrix, a 5-by-3 matrix, or any number-by-any number matrix.

In one embodiment, the electronic gaming device may include a plurality of reels. The plurality of reels may include a plurality of symbols. The electronic gaming device may include one or more paylines formed on at least a portion of the plurality of reels. The electronic gaming device may include a memory. The memory may include a scrape away module. The scrape away module may include a plurality of scrape away structures. The electronic gaming device may include a processor, which may select a scrape away structure (e.g., dirt, leaves, buildings, acorns, animals, etc.) based on a received input.

For example, one scrape away structure may be a building with a plurality of windows and a plurality of doors. Another scrape away structure may be a plurality of potential holes (e.g., treasure spots) in the ground. In another example, a scrape away structure may be a plurality of different animals (e.g., deer, bear, wolf, elk, etc.) or the same animals (e.g., deer). Another scrape away structure may be leafs. For each of these general structures there may be numerous different structures. For example, there may be 100 different building configurations. It should be noted that any number (e.g., 1-N) different configurations may be utilized.

In another example, the processor may transmit a signal related to utilizing a scrape away gaming option. In another example, the processor may display a scrape away gaming option via a display. Further, the processor may receive an input relating to utilizing the scrape away gaming option. In addition, the processor may generate game results. In another example, the processor may modify the game results based on a utilized scrape away gaming option. In addition, the processor may display a modified game result via the display.

For example, based on a scrape away result, a base game outcome may be modified. In one illustration, a scrape away result may have determined that a different game (e.g., base) results show be multiplied by 10×. In this example, the gaming result would be modified based on the 10× multiplier (e.g., 1000 credit payout based on 100 credit game payout times 10×).

In one embodiment, the method may include receiving one or more primary wagers on one or more paylines. The method may include determining a first primary wager payout. The method may include determining one or more multipliers.

In one embodiment, the electronic gaming device may include a plurality of reels. One or more paylines may be formed on a portion of the plurality of reels. The electronic gaming device may include a memory. The memory may include a plurality of scrape away structures. The electronic gaming device may include a processor, which may generate one or more areas. Each area may cover one or more symbols. The processor may remove the one or more areas to reveal one or more covered symbols.

In another example, the processor may reveal one or more covered symbols based on an input from a player. The processor may allow the input from the player for a predetermined time period. The processor may allow the input from the player for a predetermined number of picks. The processor may display via a display screen the one or more covered symbols.

In another example, the one or more symbols may include a credit amount symbol, a multiplier symbol, a free spin symbol, and/or a blank symbol. The processor may reveal one or more covered symbols based on a tool selected by a player.

In another embodiment, a method may include displaying one or more areas where each area covers one or more symbols. The method may include removing the one or more areas. The method may include revealing at least one covered symbol based on a removal of the one or more areas. The method may include generating a payout based on one or more revealed symbols.

In another example, a removal of the one or more areas may be based on an input from a player. The method may include displaying a generated payout. The method may include a removal of the one or more areas being based on an input from a player for a predetermined time period.

The method may include a removal of the one or more areas being based on an input from a player for a predetermined number of picks In another embodiment, the electronic gaming system may include a server, which includes a server memory and a server processor. The server processor may generate one or more areas. Each area may cover one or more symbols. The server processor may remove the one or more areas to reveal one or more covered symbols. The server memory may include a plurality of scrape away structures. The server processor may reveal the at least one covered symbol based on an input from a player. The server processor may allow the input from the player for a predetermined time period. The server processor may allow the input from the player for a predetermined number of picks. In another example, the server processor may display the at least one covered symbol.

In one example, the electronic gaming device may include a plurality of reels. One or more paylines may be formed on at least a portion of the plurality of reels. The electronic gaming device may include a memory and a processor. The memory may include a plurality of scrape away structures. The processor may generate one or more areas where each area covers one or more symbols. The processor may remove the one or more areas to reveal one or more covered symbols based on a selected tool and/or a selected area.

In another example, the processor may reveal the one or more covered symbols based on one or more interactions between the selected tool and the selected area. In one example, the processor may generate one or more presentations based on the one or more interactions between the selected tool and the selected area. In an example, the processor may allow a second selection relating to a second selected tool and to reveal one or more covered symbols based on the second selected tool and a second selected area. In one example, the processor may display the one or more covered symbols. In another example, the processor may display the one or more covered symbols. In an example, the one or more covered symbols may include a credit amount symbol, a multiplier symbol, a free spin symbol, and/or a blank symbol. In one example, the processor may reveal the at least one covered symbols based on a tool selected by a player.

In another embodiment, the method of providing gaming options via an electronic gaming device may include displaying one or more areas where each area covers one or more symbols. The method may include removing the one or more areas. The method may include revealing one or more covered symbols based on a removal of the one or more areas, one of a selected tool, and/or a selected area. The method may include generating a payout based on the one or more revealed symbols.

In another example, the method may include revealing the one or more covered symbols based on one or more interactions between the selected tool and the selected area. In an example, the one or more covered symbols may include a credit amount symbol, a multiplier symbol, a free spin symbol, and/or a blank symbol. In one example, the method may include generating one or more presentations based on the one or more interactions between the selected tool and the selected area. In an example, the method may include allowing a second selection relating to a second selected tool and to reveal one or more covered symbols based on the second selected tool and a second selected area. In an example, the method may include displaying the one or more covered symbols.

In another embodiment, the electronic gaming system may include a server, which includes a server memory and a server processor. The server processor may generate one or more areas. Each area covers one or more symbols. The server processor may remove the one or more areas to reveal one or more covered symbols based on a selected tool and a selected area. The server memory may include a plurality of scrape away structures.

In one example, the server processor may reveal the at least one covered symbol based on an input from a player. In another example, the server processor may allow the input from the player for a predetermined time period. In one example, the server processor may allow the input from the player for a predetermined number of picks. In another example, the server processor may display the at least one covered symbol. In one example, the server processor may display the at least one covered symbol.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a plurality of reels, one or more paylines formed on at least a portion of the plurality of reels;

a memory, the memory including a plurality of scrape away structures; and a processor configured to generate one or more areas, each area covers one or more symbols;

wherein the processor is further configured to remove by utilizing at least one scrape away structure the one or more areas to reveal one or more covered symbols based on a selected tool and a selected area, the processor configured to generate a first scrape away presentation based on the first tool selection and to generate a second scrape away presentation based on the second tool selection;

wherein the first scrape away presentation removes a first portion of a first covered area to reveal a first portion of a first prize during a first part of the first scrape away presentation and the first scrape away presentation removes a second portion of the first covered area to reveal a second portion of the first prize during a second part of the first scrape away presentation; and wherein the second scrape away presentation removes a third portion of a second covered area to reveal a first portion of a second prize during a third part of the second scrape away presentation and the second scrape away presentation removes a fourth portion of the second covered area to reveal a second portion of the second prize during a fourth part of the second scrape away presentation.

2. The electronic gaming device of claim 1, wherein the processor is further configured to reveal the one or more covered symbols based on one or more interactions between the selected tool and the selected area.

3. The electronic gaming device of claim 2, wherein the processor is further configured to generate one or more presentations based on the one or more interactions between the selected tool and the selected area.

4. The electronic gaming device of claim 2, wherein the processor is further configured to allow a second selection relating to a second selected tool and to reveal one or more covered symbols based on the second selected tool and a second selected area.

5. The electronic gaming device of claim 2, wherein the processor is further configured to display the one or more covered symbols.

6. The electronic gaming device of claim 1, wherein the processor is further configured to display the one or more covered symbols.

7. The electronic gaming device of claim 4, wherein the one or more covered symbols include at least one of a credit amount symbol, a multiplier symbol, a free spin symbol, and a blank symbol.

8. The electronic gaming device of claim 1, wherein the processor is further configured to reveal the at least one covered symbols based on a tool selected by a player.

9. A method of providing gaming options via an electronic gaming device comprising:

displaying one or more areas where each area covers one or more symbols;

removing by utilizing at least one scrape away structure the one or more areas;

generating a first scrape away presentation based on a first tool selection;

generating a second scrape away presentation based on a second tool selection;

revealing one or more covered symbols based on a removal of the one or more areas and at least one of a selected tool and a selected area; and generating a payout based on the one or more revealed symbols;

wherein the first scrape away presentation removes a first portion of a first covered area to reveal a first portion of a first prize during a first part of the first scrape away presentation and the first scrape away presentation removes a second portion of the first covered area to reveal a second portion of the first prize during a second part of the first scrape away presentation; and wherein the second scrape away presentation removes a third portion of a second covered area to reveal a first portion of a second prize during a third part of the second scrape away presentation and the second scrape away presentation removes a fourth portion of the second covered area to reveal a second portion of the second prize during a fourth part of the second scrape away presentation.

10. The method of claim 9, further comprising revealing the one or more covered symbols based on one or more interactions between the selected tool and the selected area.

11. The method of claim 9, wherein the one or more covered symbols include at least one of a credit amount symbol, a multiplier symbol, a free spin symbol, and a blank symbol.

12. The method of claim 9, further comprising generating one or more presentations based on the one or more interactions between the selected tool and the selected area.

13. The method of claim 9, further comprising allowing a second selection relating to a second selected tool and to reveal one or more covered symbols based on the second selected tool and a second selected area.

14. The method of claim 9, further comprising displaying the one or more covered symbols.

15. An electronic gaming system comprising:

a server including a server memory and a server processor, the server processor configured to generate one or more areas, each area covers one or more symbols, the server processor is further configured to remove by utilizing at least one scrape away structure the one or more areas to reveal one or more covered symbols based on a selected tool and a selected area, the server processor configured to generate a first scrape away presentation based on a first tool selection and to generate a second scrape away presentation based on a second tool selection; and the server memory including a plurality of scrape away structures;

wherein the first scrape away presentation removes a first portion of a first covered area to reveal a first portion of a first prize during a first part of the first scrape away presentation and the first scrape away presentation removes a second portion of the first covered area to reveal a second portion of the first prize during a second part of the first scrape away presentation; and wherein the second scrape away presentation removes a third portion of a second covered area to reveal a first portion of a second prize during a third part of the second scrape away presentation and the second scrape away presentation removes a fourth portion of the second covered area to reveal a second portion of the second prize during a fourth part of the second scrape away presentation.

16. The electronic gaming system of claim 15, wherein the server processor is further configured to reveal the at least one covered symbol based on an input from a player.

17. The electronic gaming system of claim 16, wherein the server processor is further configured to allow the input from the player for a predetermined time period.

18. The electronic gaming system of claim 16, wherein the server processor is further configured to allow the input from the player for a predetermined number of picks.

19. The electronic gaming system of claim 16, wherein the server processor is further configured to display the at least one covered symbol.

20. The electronic gaming system of claim 15, wherein the server processor is further configured to display the at least one covered symbol.

* * * * *